United States Patent [19]

McClean

[11] Patent Number: 4,458,139

[45] Date of Patent: Jul. 3, 1984

[54] ELECTRICALLY HEATED COOKING UTENSIL

[75] Inventor: John W. McClean, Sydney, Australia

[73] Assignee: Breville Holdings Pty., Limited, Pyrmont, Australia

[21] Appl. No.: 400,399

[22] Filed: Jul. 21, 1982

[30] Foreign Application Priority Data

Aug. 5, 1981 [AU] Australia .............................. PF0062
Jun. 24, 1982 [AU] Australia .............................. PF4575

[51] Int. Cl.³ ............................................ F27D 11/02
[52] U.S. Cl. .................................... 219/433; 219/430; 219/432; 219/435; 219/439; 219/441; 219/462
[58] Field of Search ............... 219/430, 432, 433, 434, 219/435, 436, 439, 441, 447, 462, 464, 530; 99/447

[56] References Cited

U.S. PATENT DOCUMENTS

| | | | |
|---|---|---|---|
| 678,522 | 7/1901 | Seips | 219/433 |
| 726,241 | 4/1903 | Ayer | 219/433 |
| 910,479 | 1/1909 | Andrews | 219/433 |
| 1,006,104 | 10/1911 | Kuhn et al. | 219/433 |
| 1,047,088 | 12/1912 | Kuhn | 219/433 |
| 1,954,128 | 4/1934 | Heyroth et al. | 219/461 |
| 2,543,052 | 2/1951 | Park | 219/433 |
| 3,028,476 | 4/1962 | Hug | 219/443 |
| 3,659,604 | 5/1972 | Melville et al. | 219/433 X |
| 4,268,741 | 5/1981 | O'Brien | 219/439 |
| 4,313,050 | 1/1982 | Abenaim | 219/432 |

FOREIGN PATENT DOCUMENTS

326321 9/1920 Fed. Rep. of Germany ...... 219/433

*Primary Examiner*—Volodymyr Y. Mayewsky
*Attorney, Agent, or Firm*—Holman & Stern

[57] ABSTRACT

An electrically heated cooking utensil consisting of a base incorporating an electrically heated heating plate (13) having a flat upper surface and a utensil such as a frying pan (10) dutch oven or wok having a handle (11) the bottom (12) of the utensil being flat and in use lying in close contact with the heating plate (13) the utensil and the base having on them interengaging elements (23), (16) such that when the bottom of the utensil is placed on the base movement of one of said interengaging elements (23), (16) causes the elements to interlock so that the base and the utensil are interconnected in such a manner that the utensil and base can be lifted together by use of the handle and so that the utensil can be detached from the base while the base is resting on a supporting surface. Preferably interengaging elements (23) on the base are moveable by means of a lever (19) projecting beyond the base.

10 Claims, 4 Drawing Figures

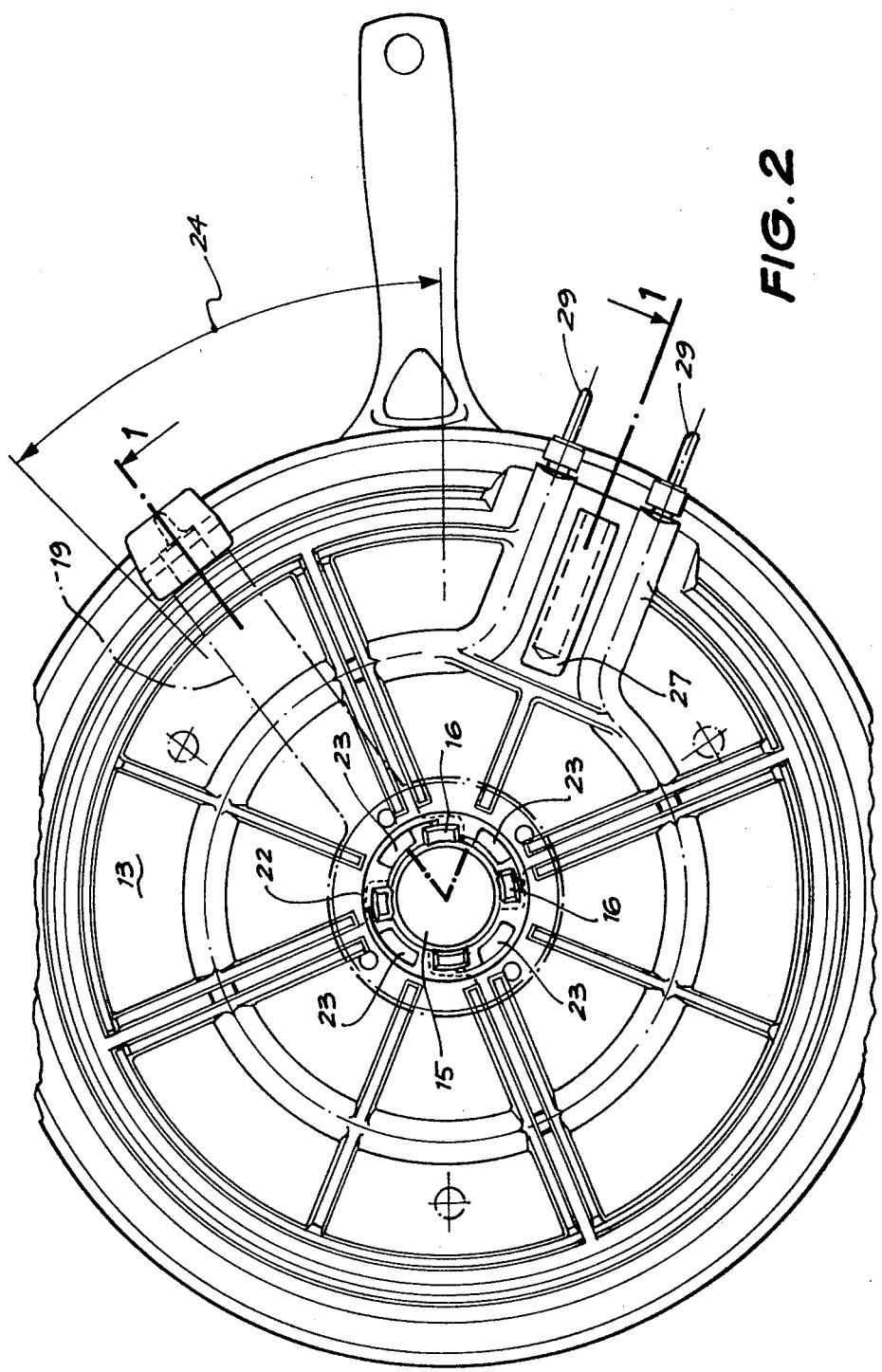

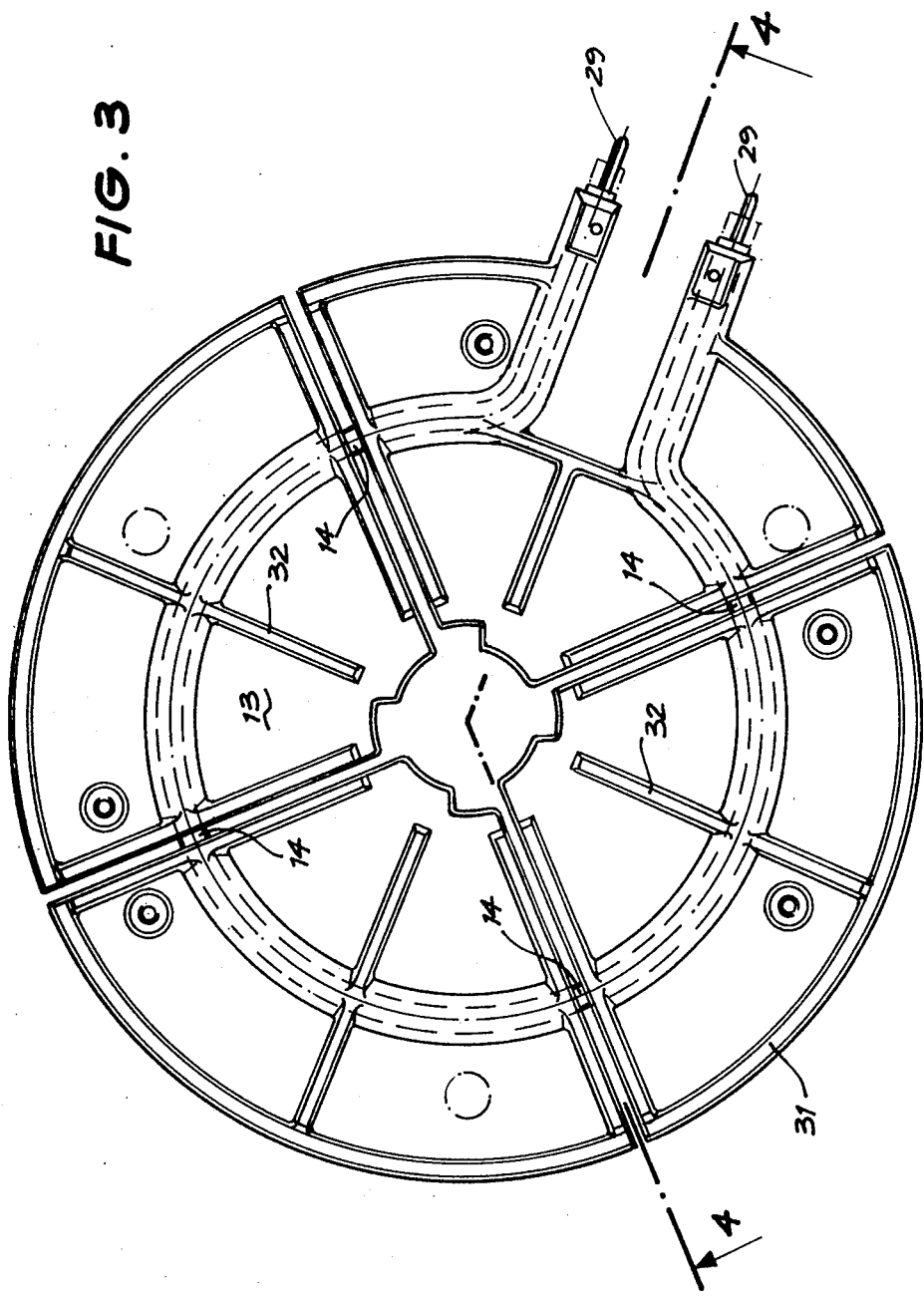

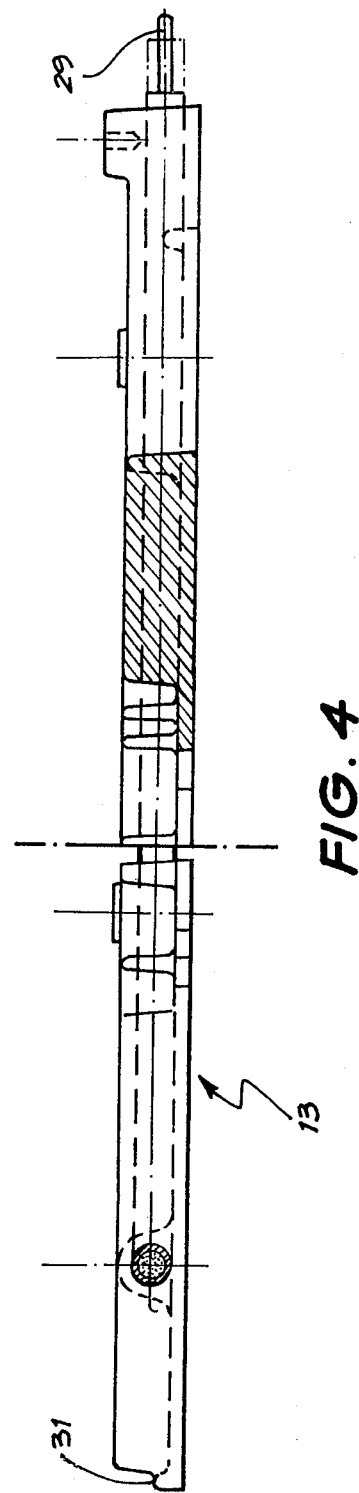

ELECTRICALLY HEATED COOKING UTENSIL

The present invention relates to an electrically heated cooking utensil of the kind exemplified by, for example, an electrically heated frying pan.

It is well known to make electrically heated utensils including vessels such as frying pans with an electric heating element in the base of the pan, the heating element being incorporated as an integral and undetachable part of the base. It is also known to make utensils such as electrically heated frying pans in which a heating element is incorporated in a separable member which is affixed to the base of the pan by screwing. The purpose of this arrangement is that the electric heating element and the connector associated with it may be removed completely from the pan while it is being cleaned. This arrangement while satisfactory in many respects necessitates the turning over of the pan to enable the heating element containing portion to be unscrewed from the base. This is an inconvenient and difficult operation particularly in the case of pans made from cast iron that are relatively heavy.

The object of the present invention is to provide an electrically heated cooking utensil in which the vessel element of the utensil is separable from and attachable to a base including an electric heating element in a particularly simple and convenient manner without lifting the base from a bench or other supporting surface. It is another object of the invention to provide a construction such that a range of different vessels such as a frying pan, a dutch oven and a wok may be provided, any one of which can be readily attached to or detached from a base incorporating an electric heating element.

The present invention consists in an electrically heated cooking utensil comprising a base adapted to rest on a table top or other horizontal surface, the base incorporating an electric heating element and electrical connector means therefor, the electric heating element being arranged in or on the underside of a heating plate having an upper surface a substantial part of which is flat, and a vessel such as a frying pan, dutch oven or wok having on it handle means whereby it can be lifted and a bottom, the underside of which is flat over a substantial part of its area and is shaped so that when the vessel is placed on the base flat areas of the bottom of the vessel and the heating plate are in close contact to facilitate transfer of heat from the heating element to the bottom, the vessel and the base having on them interengaging elements such that when the bottom of the vessel is placed on the base movement of one of said interengaging elements about a vertical axis causes said elements to interlock whereby the base and the vessel are interconnected in such a manner that the vessel and base can be lifted together by use of the handle means on the vessel and whereby the vessel can be detached from the base while the base is resting on a supporting surface.

It is preferred that the interconnecting element on the base is made moveable so that the vessel and the base can be interlocked by movement of the interengaging element associated with the base.

It has been found very important to construct the heating plate in such a manner that a minimum of buckling occurs as a result of heating. If the plate can be maintained flat within approximately 1 mm of a horizontal plane satisfactory heat transfer between the plate and the vessel can be achieved. One way of doing this has been found to be the construction of the plate in the form of four more or less separate quadrants which, are joined only at the point at which the electric heating element is attached to the plate.

It has been further discovered that in a practical commercial construction it is impossible to have more than a small area of the plate in direct metal to metal contact with the bottom of the utensil, so that, in practice the majority of the heat is transferred from the plate to the vessel by radiation. It has been found that the evenness of the heating of the bottom of the vessel can be improved significantly by giving to the upper surface of the heating plate a mat-black finish.

In order that the invention may be better understood a preferred embodiment thereof is hereinafter described by way of example with reference to the accompanying drawings in which:

FIG. 2 is a view of the utensil shown from below with the undershield removed;

FIG. 3 is a plan view of the heating plate incorporating an electric heating element; and FIG. 4 is a cross sectional view on line 4—4 of FIG. 3.

Figure 1:
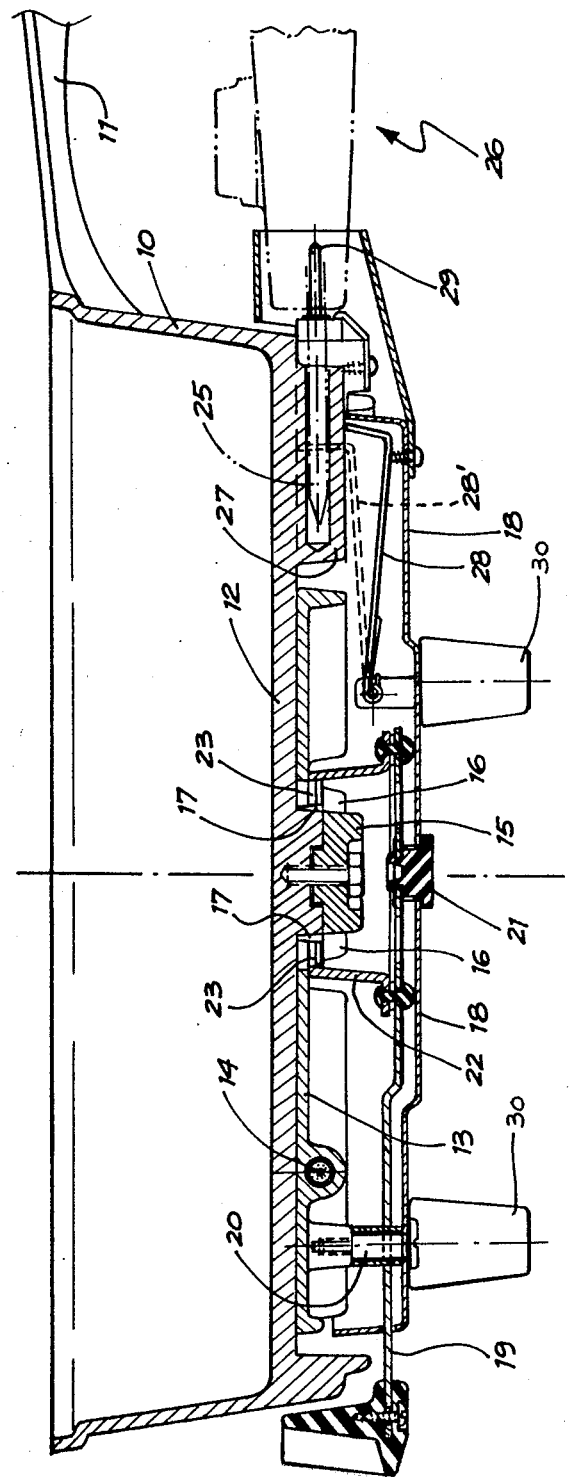
FIG. 1 is a cross sectional elevation of line 1—1 of FIG. 2 of a cooking utensil according to the invention showing the vessel connected to the base.

In the embodiment of the utensil illustrated, the vessel is a cast-iron frying pan having a side wall 10 from which an integral handle 11 projects and a bottom 12, all being formed from a single casting. The flat underside of the bottom 12 rests on the flat uppersurface of a heating plate 13 which incorporates a heating element 14. The bottom 12 of the vessel is provided with a central boss 15 having four radially extending lugs 16. For convenience in manufacture these are formed separately from the boss 15 and are fixed to it but, at the cost of complexity in manufacture an integral structure could be utilized. As is seen in FIG. 1 there is a space 17 between the upper surface of each lug 16 and the undersurface of the bottom 12. The heating plate 13 is associated with an undershield in the form of a shallow pressed steel tray 18 to the centre of which a locking arm 19 is rotatably attached by means of a central rivet 21. Associated with the locking arm 19 is an annular sleeve 22 having on it at its upper end four inwardly directed radial lugs 23. The locking arm 19 is movable through an arc indicated at 24 in FIG. 2. In the locked position shown in that Figure the lugs 23 lie in the space 17 between the lugs 16 and the underside of the bottom 12 thus holding the heating plate 13 closely against the bottom of the utensil. If the locking arm is moved through the arc 24 to the unlocked position the lugs 23 lie in the spaces between the lugs 16 and the vessel is then separable from the heating plate. To replace the utensil on the heating plate it is only necessary to ensure that the locking arm 19 is in the unlocked position whereupon the vessel can be lowered onto the heating plate in such a manner that the lugs 23 pass into the spaces between the lugs 16. The underside of the bottom 12 of the vessel will then rest on the heating plate 10 and by moving the locking arm to the locked position the two will tend to be pressed together and held in the locked position. In this position the vessel can be moved around together with the base as desired.

The vessel is readily removed without lifting the base from a supporting surface by moving the locking arm to the unlocked position when it may be lifted off the base.

The pressed steel tray 18 is attached to the heating plate 13 by screws such as 20 which serve also to secure feet 30 to the tray 18. One of these feet may be mounted in such a manner as to make its effective height adjustable whereby the bottom of the frypan may be tilted slightly to cause fat to collect at one point on the circumference. By reason of the attachment of the tray 18 to the heating plate 13 the lugs 23 on the annular sleeve 22 are also attached to the heating plate 13. These lugs constitute the interengaging elements on the base, the lugs 16 constituting the interengaging elements of the utensil.

A probe 25 of a variable thermostat control 26 is accommodated in a cast iron sheath 27 formed integrally with or brazed to the bottom 12 of the vessel to give more reliable heat control of the cooking surface. A snap action thermostat with a 240° C. maximum heat specification is used to comply with international requirements. The thermostat control 26 includes a socket adapted to engage with pins 29 connected to the ends of the electric heating element 14 embedded in the heating plate 13. It will be appreciated that as pins 29 are attached to the heating plate and as the probe 25 enters sheath 27 in the utensil, the vessel cannot be removed from the heating plate until the thermostat control 26 is removed.

In order to prevent the connection of the variable thermostat control 26 to the heating plate 13 in the absence of the vessel, which could result in overheating and destruction of the heating plate, a lock out mechanism is provided in the form of a spring arm 28 which, when the vessel is removed from the heating plate occupies the position indicated in broken lines at 28', the up turned extremity of the arm 28 acting to block entrance for the probe 25 and thus prevent the making of electrical connection to the heating plate. When the vessel is in place however the arm 28 is depressed to the full line position shown, thus enabling the probe 25 to be inserted.

The tray 18 may be provided with holes beneath the pocket 27 to allow entry of air for cooling purposes and the attachment holes through which the screws 20 pass may be elongated in a radial direction to allow for any expansion and contraction of the heating plate.

The heating plate 13 is shown in FIGS. 3 and 4. This is made by die casting from an aluminium alloy consisting preferably of aluminium 95.9%, manganese 2.0%, nickel 2.0% and titanium 0.1%. As is best seen in FIG. 3 the plate is made in four separate segments, the segments being held together by means of the electric heating element 14 passing through them. This is achieved by inserting the heating element in the mould before casting the plate. Experiment has shown that it is important to maintain the heating plate and in particular its upper surface as flat as possible during operation and it has been found that by making the plate in a number of separate parts as described above the plate is permitted to expand and contract without building up inner stresses leading to the buckling of the surface of the plate which would cause inefficient heat transfer to the bottom of the utensil. Experimental work with an arrangement such as that illustrated has shown that the heating plate will stay flat in relation to a horizontal plane within approximately 1 mm. The rigidity of the plate is assisted by a peripheral flange 31 and radially extending ribs such as 32. The flat surface of the heating plate 13 is painted matt black with a paint capable of withstanding a temperature of 450° C. As explained above it has been found that this significantly improves the evenness of heat at the bottom of the vessel.

As has been stated above the arrangement described may be applied to a range of different vessels such as, for example, a dutch oven or a wok and it is very simple to have a range of vessels, any one of which can fit on the same base. This leads to economy in that it is necessary to have only one base with an electrically heating element, for the complete range of vessels. Each vessel would have a similar flat undersurface and means for interconnection with the base. The remainder of the vessel would, however, be constructed to suit the particular purpose for which it was intended.

I claim:
1. In an electrically heated cooking utensil of the type including a base having a heat-conductive heating plate for supporting a vessel including at least a heat-conductive bottom and an electrical heating element and electrical connector means thereof. The electrical heating element being carried by and heating the heating plate which in turn heats the bottom surface of the vessel, the improvement comprising means for removably and interlockingly engaging the vessel and the base including:
 a vessel having a central boss on the bottom undersurface thereof, said central boss having interengaging boss elements disposed on the surface thereof;
 a heating plate having a central aperture therein for receiving the central boss therethrough when the vessel is supported on the heating plate;
 vessel engaging means rotatably connected to the base for rotation about a vertical axis thereof, comprising a rotatable central sleeve coaxial with the central boss, and interengaging sleeve elements disposed on the inner surface of the central sleeve for interengagement with the interengaging boss elements upon rotation of the sleeve; and
 lever means operatively connected to the central sleeve for rotating the central sleeve to lockingly engage and disengage the interengaging boss and sleeve elements.
2. The utensil of claim 1, wherein the heating plate comprises a plurality of separate segments interconnected by an electric heating element.
3. The utensil of claim 1, wherein the surface of the heating plate is coated with a matte black heat-resistant coating.
4. The utensil of claim 1, further including variable thermostat control means connectable to said heating element for regulating the temperature of the cooking surface of the vessel, said control means having a thermostatic probe receivable within a sheath in the bottom surface of the vessel.
5. The utensil of claim 4, further including lockout means for preventing connection of the variable thermostat control means to the electric heating element when the vessel is not on the base.
6. The utensil of claim 5, wherein said lockout means comprises a spring biased control element responsive to placement of the vessel on, and removal of the vessel from, the heating plate.
7. The utensil of claim 1, wherein the vessel is cast iron.
8. The utensil of claim 1, wherein the interengaging boss elements comprise a plurality of radially-extending boss lugs spaced from the undersurface of the heating plate, and the interengaging sleeve elements comprise a plurality of inwardly-radially extending sleeve lugs adapted for interengaging disposition between said boss lugs and said heating plate upon rotation of said sleeve.

9. The utensil of claim 8, further including a heat shield tray spaced below said heating plate, and said lever means comprises a lever rotatable about a central pivot element attached to the heat shield tray below the central boss.

10. The utensil of claim 9, wherein said central sleeve is affixed to said lever.

* * * * *